US012390842B2

(12) United States Patent
Jeong et al.

(10) Patent No.: US 12,390,842 B2
(45) Date of Patent: Aug. 19, 2025

(54) SUPPORTING STRUCTURE, APPARATUS FOR SUPPORTING SUBSTRATE AND FACILITY FOR PROCESSING SUBSTRATE

(71) Applicant: SEMES CO., LTD., Chungcheongnam-do (KR)

(72) Inventors: Jae Hun Jeong, Chungcheongnam-do (KR); Cheol Yong Shin, Chungcheongnam-do (KR); Wan Hee Jeong, Chungcheongnam-do (KR); Do Youn Lim, Chungcheongnam-do (KR)

(73) Assignee: SEMES C0., LTD., Chungcheongnam-do (KR)

( * ) Notice: Subject to any disclaimer, the term of this patent is extended or adjusted under 35 U.S.C. 154(b) by 328 days.

(21) Appl. No.: 18/105,883

(22) Filed: Feb. 6, 2023

(65) Prior Publication Data

US 2023/0338997 A1 Oct. 26, 2023

(30) Foreign Application Priority Data

Apr. 21, 2022 (KR) ........................ 10-2022-0049708

(51) Int. Cl.
*B08B 11/02* (2006.01)
*B08B 3/02* (2006.01)
*B08B 3/08* (2006.01)

(52) U.S. Cl.
CPC ................ *B08B 11/02* (2013.01); *B08B 3/02* (2013.01); *B08B 3/08* (2013.01)

(58) Field of Classification Search
CPC ........................ H01L 21/6833; H01L 21/6831
See application file for complete search history.

(56) References Cited

U.S. PATENT DOCUMENTS 5,376,213 A * 12/1994 Ueda ................. H01L 21/67126 156/345.53
5,431,737 A * 7/1995 Keller ............... H01L 21/68785 118/503
5,796,074 A * 8/1998 Edelstein ............ C23C 16/4586 219/390
6,503,131 B1 * 1/2003 Franklin ................. B24B 37/16 451/296
6,853,533 B2 * 2/2005 Parkhe .............. H01L 21/67109 361/234

(Continued)

FOREIGN PATENT DOCUMENTS

JP 2013-171901 9/2013
JP 2021-533560 12/2021

(Continued)

OTHER PUBLICATIONS

Office Action dated Oct. 27, 2023 for Korean Patent Application No. 10-2022-0049708 and its English translation from Global Dossier.

*Primary Examiner* — Jason L Vaughan
(74) *Attorney, Agent, or Firm* — WOMBLE BOND DICKINSON (US) LLP

(57) ABSTRACT

A support structure, includes: a support plate supporting a substrate; a lower cover covering a lower portion of the support plate; and a catching unit comprising a concave-convex structure having portions corresponding to each other so that the support plate and the lower cover are rotated and assembled with each other.

19 Claims, 9 Drawing Sheets

(56) References Cited

U.S. PATENT DOCUMENTS

| | | | | |
|---|---|---|---|---|
| 7,329,065 | B2 * | 2/2008 | Hu | F16D 1/033<br>403/348 |
| 7,480,129 | B2 * | 1/2009 | Brown | H01L 21/6831<br>451/296 |
| 7,589,950 | B2 * | 9/2009 | Parkhe | H01L 21/6831<br>279/128 |
| 9,030,797 | B2 * | 5/2015 | Wiltsche | H01L 21/67103<br>361/230 |
| 9,412,579 | B2 * | 8/2016 | Sadjadi | H01L 21/3065 |
| 9,969,022 | B2 * | 5/2018 | Parkhe | B23K 1/0008 |
| 11,282,735 | B2 * | 3/2022 | Shi | H01L 21/67248 |
| 11,887,878 | B2 * | 1/2024 | Rao | H01L 21/68742 |
| 12,014,906 | B2 * | 6/2024 | Johanson | H01J 37/32724 |
| 2008/0017116 | A1 * | 1/2008 | Campbell | C23C 14/505<br>118/728 |
| 2015/0165492 | A1 | 6/2015 | Avoyan et al. | |
| 2021/0242049 | A1 | 8/2021 | Natarajan et al. | |
| 2021/0299713 | A1 | 9/2021 | Demura et al. | |

FOREIGN PATENT DOCUMENTS

| | | |
|---|---|---|
| KR | 20-1991-0001605 | 1/1991 |
| KR | 2003-0046990 | 6/2003 |
| KR | 10-2009-0123128 | 12/2009 |
| KR | 10-2013-0095466 | 8/2013 |
| KR | 10-2015-0068917 | 6/2015 |
| KR | 10-2021-0122198 | 10/2021 |

* cited by examiner

[FIG. 1]
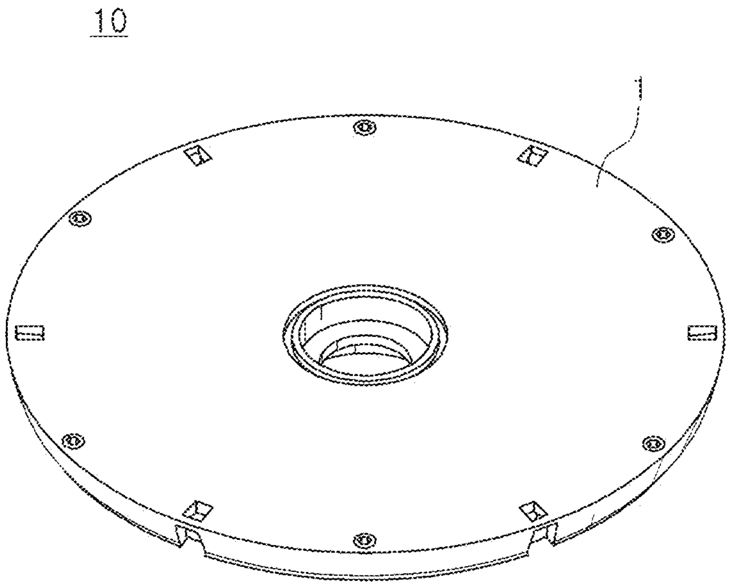
RELATED ART

[FIG. 2]
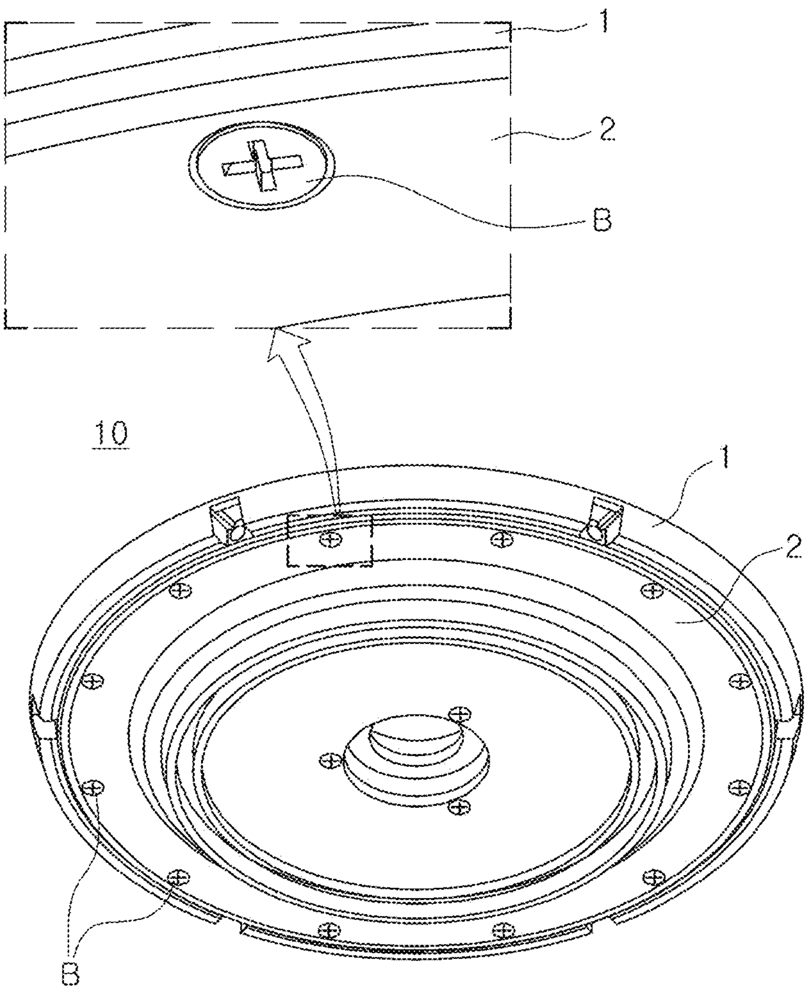
RELATED ART

[FIG. 3]
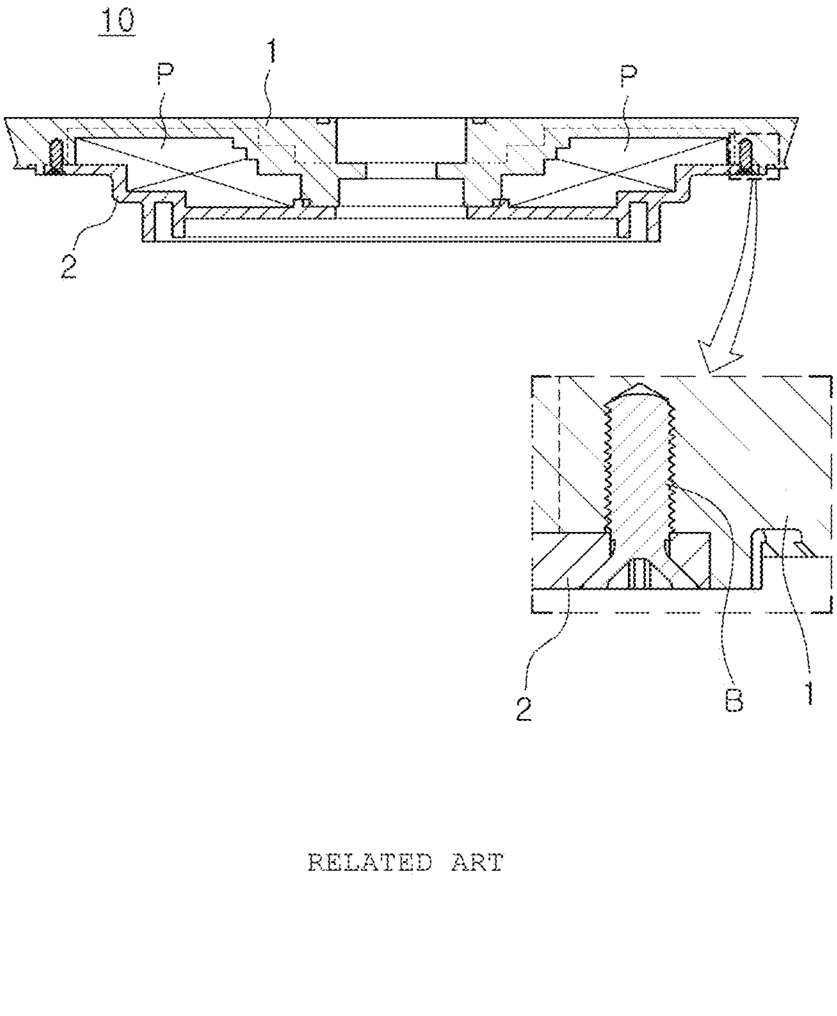
RELATED ART

[FIG. 4]
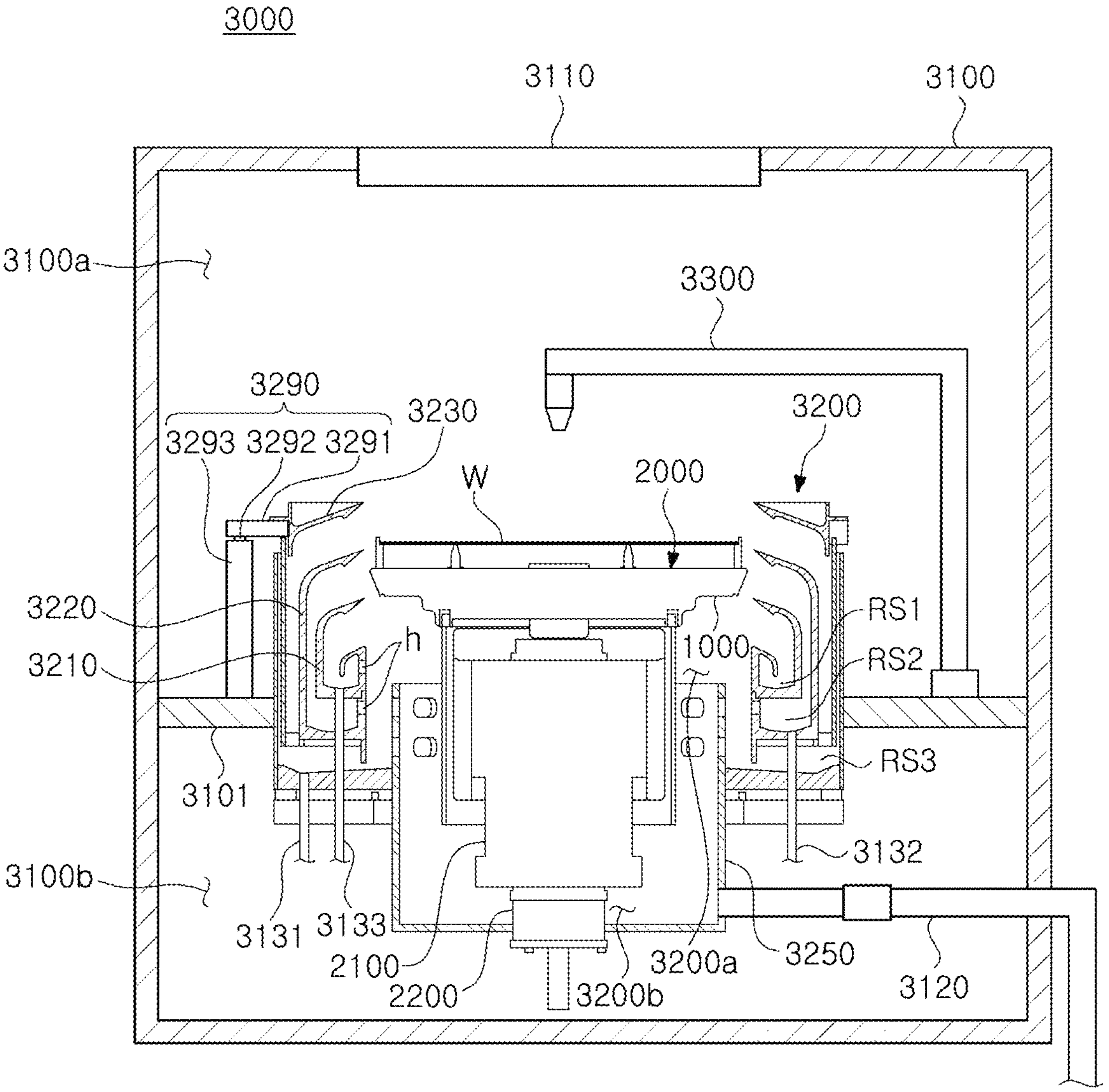

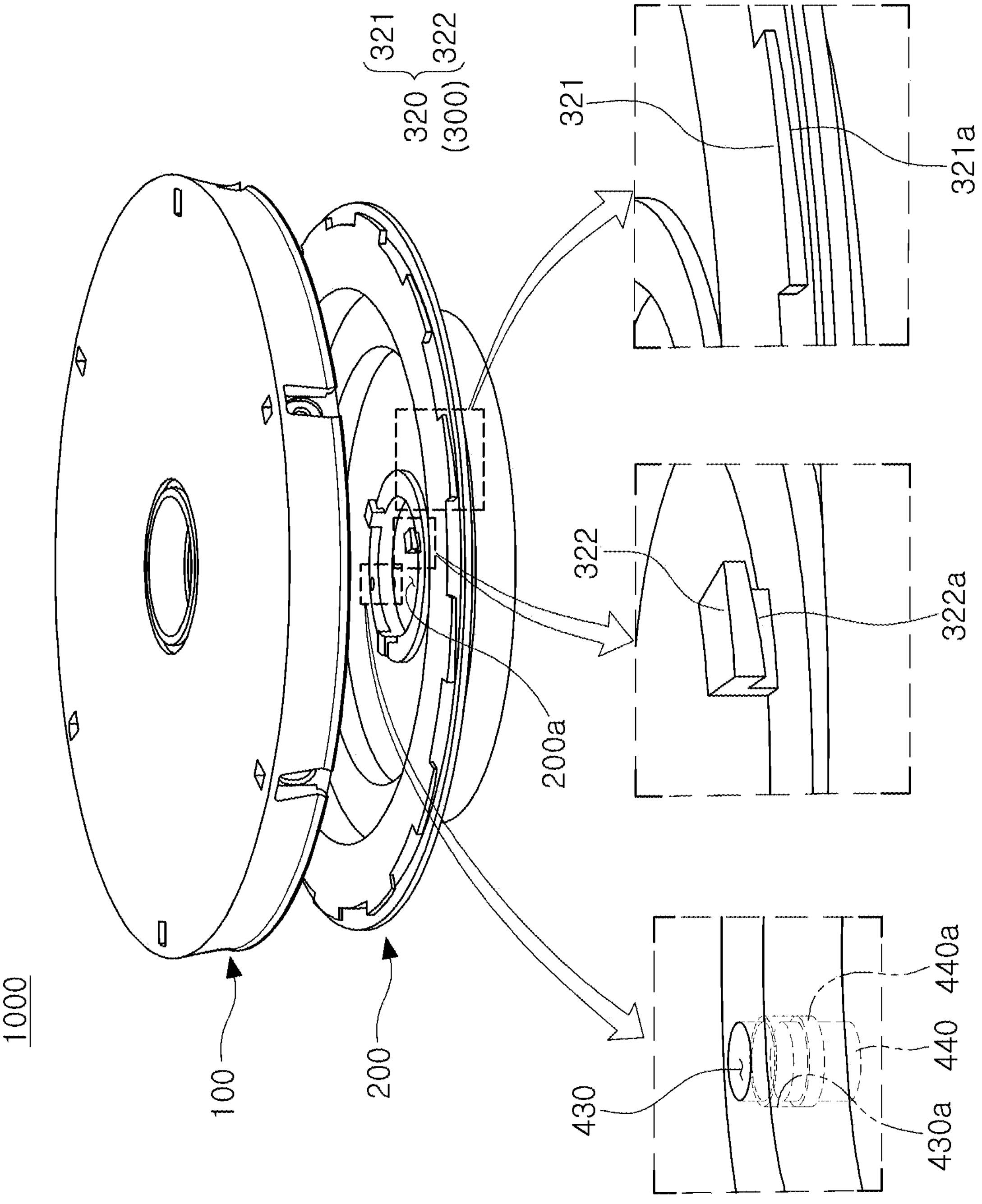
[FIG. 5]

[FIG. 6]
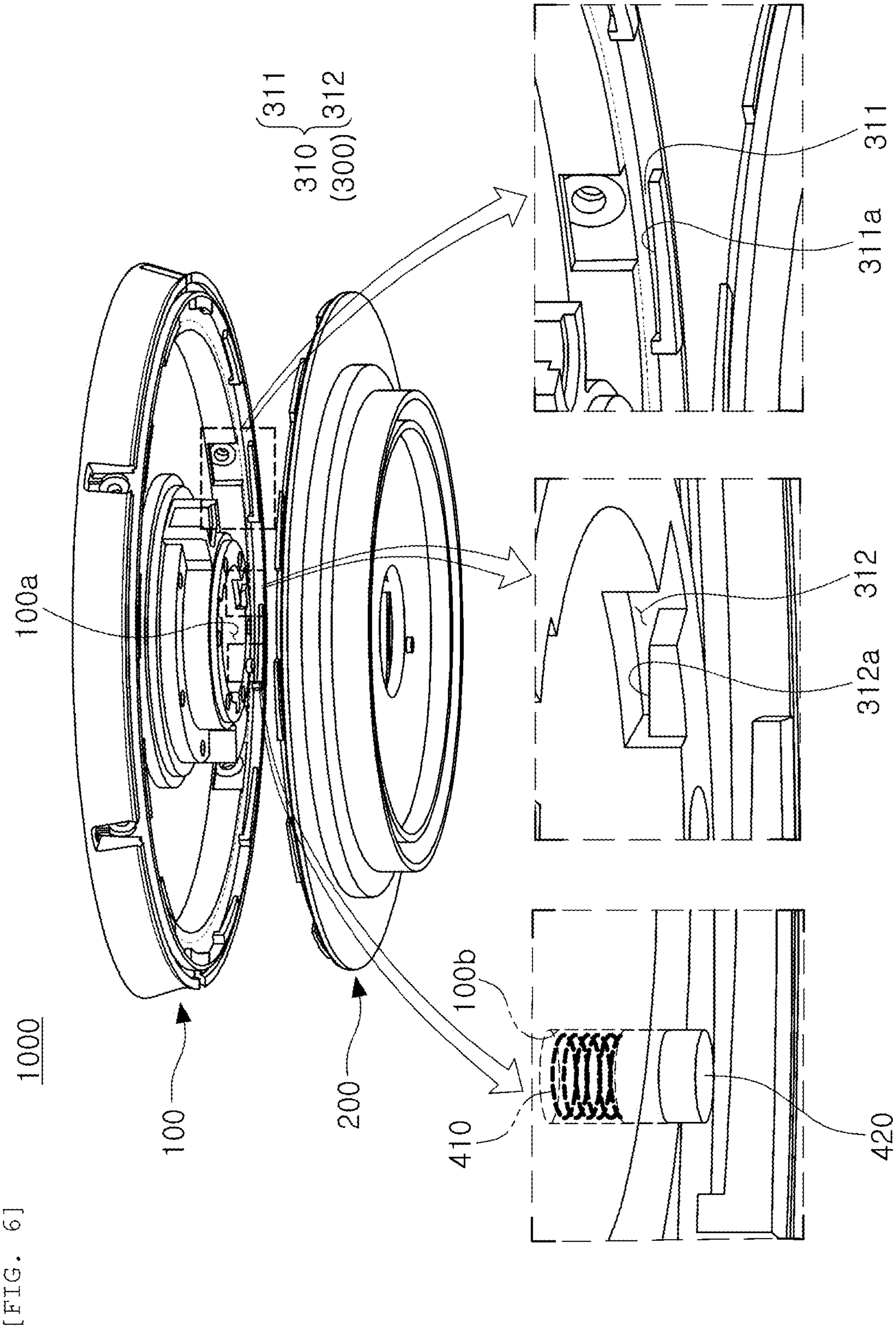

[FIG. 7]
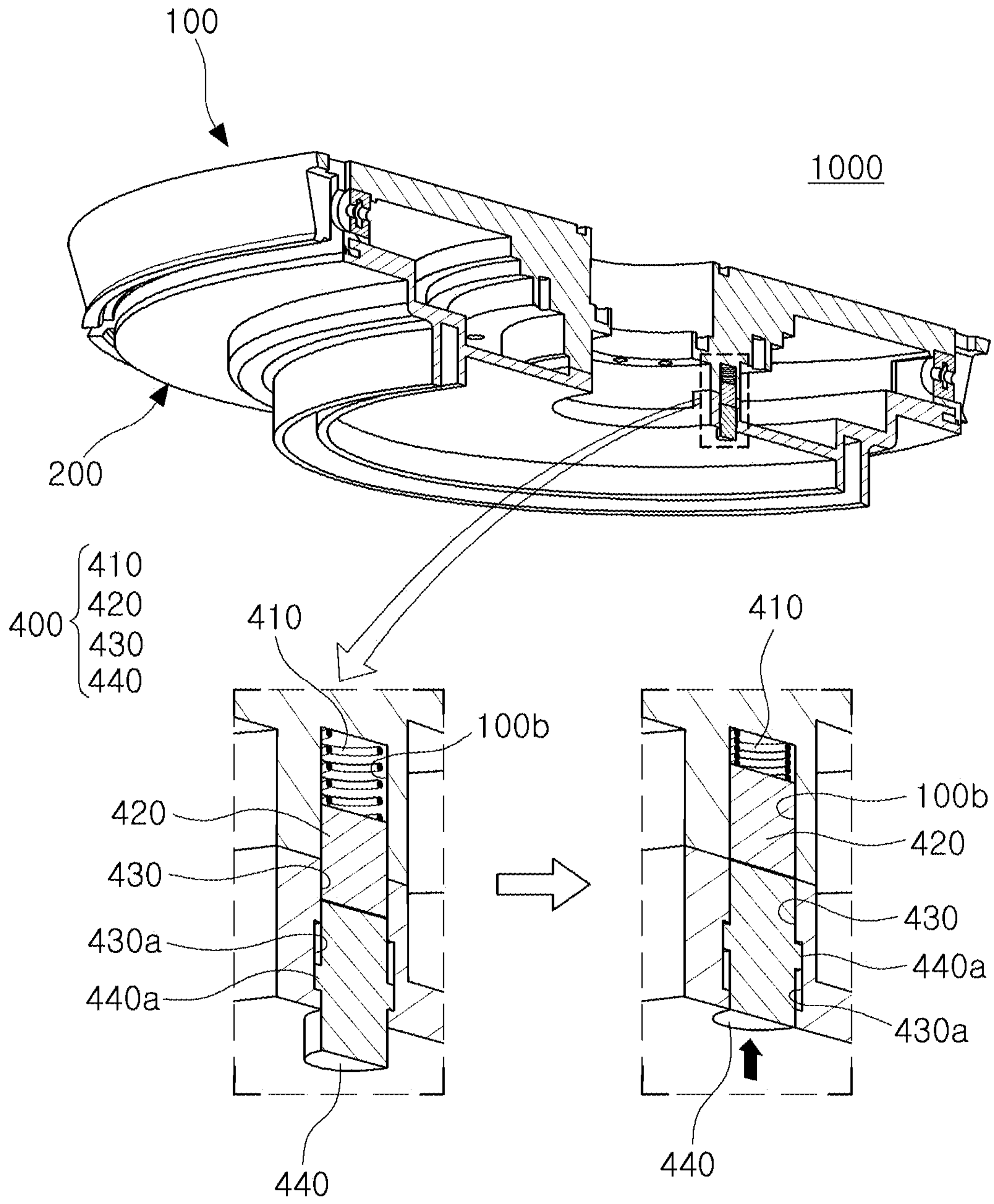

[FIG. 8]
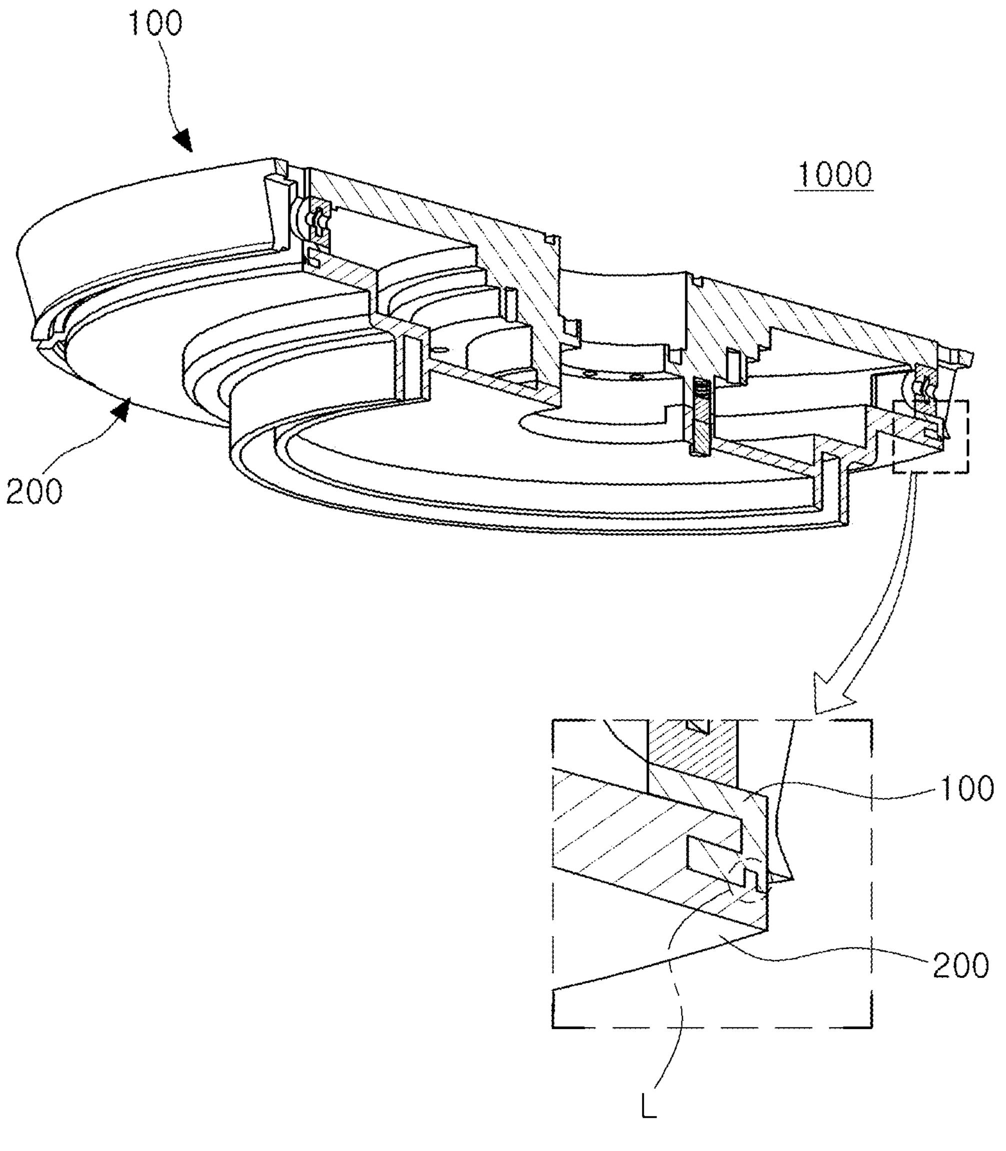

[FIG. 9]
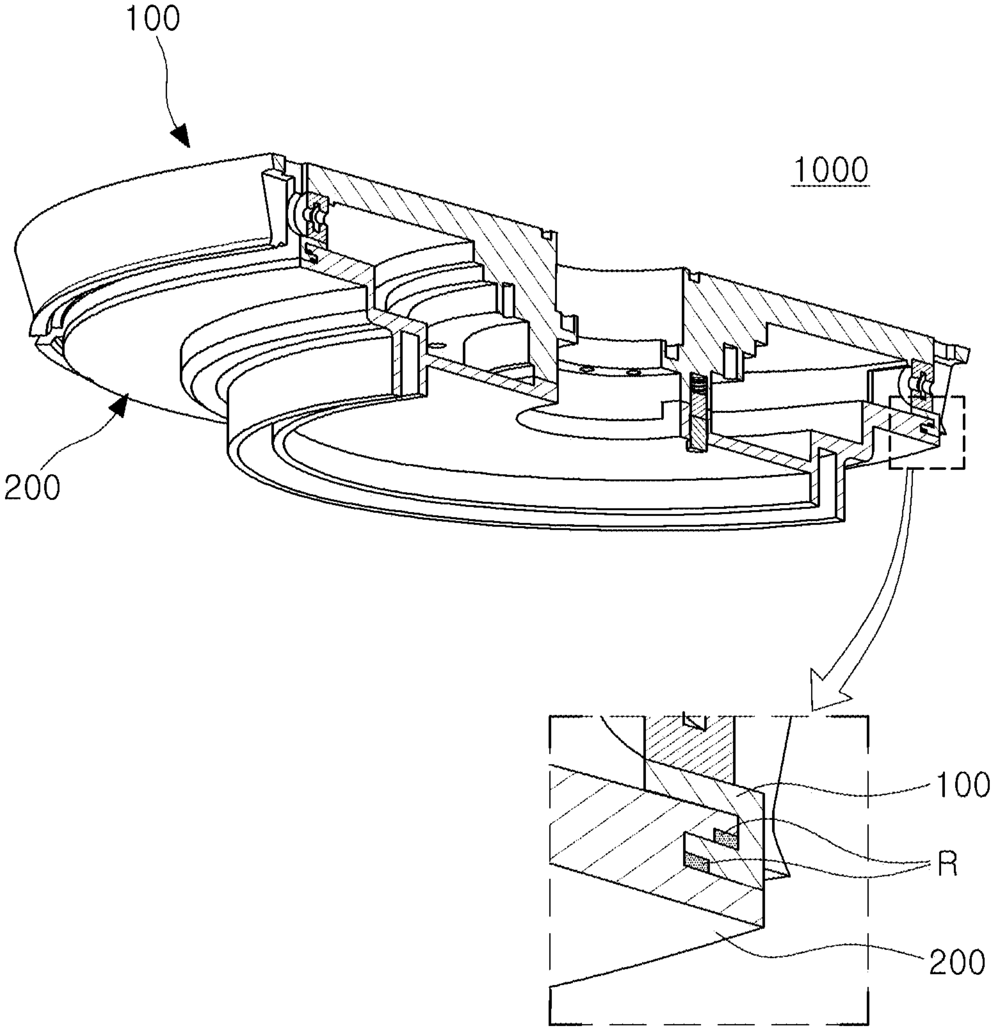

SUPPORTING STRUCTURE, APPARATUS FOR SUPPORTING SUBSTRATE AND FACILITY FOR PROCESSING SUBSTRATE

CROSS-REFERENCE TO RELATED APPLICATION(S)

This application claims the benefit under 35 USC 119(a) of Korean Patent Application No. 10-2022-0049708 filed on Apr. 21, 2022 in the Korean Intellectual Property Office, the entire disclosure of which is incorporated herein by reference for all purposes.

BACKGROUND

The present disclosure relates to a support structure supporting a substrate, an apparatus for supporting a substrate and a facility for processing a substrate including the same.

In a clean facility in which an etching process is performed using water cleaning and a chemical solution, as illustrated in FIGS. 1 to 3, a chuck 10 forms a structure in which an upper plate 1 and a lower cover 2 are fastened to each other, a chuck pin actuating structure P for holding a wafer is installed thereinside, and the lower cover 2 protects the chuck pin actuating structure P from a chemical solution.

The lower cover 2 is fastened to the upper plate 1 with bolts (counterhead bolts) (B), and during an etching process, a portion of the chemical solution seeps into the bolts (B) and threads are corroded, weakening the fastening force to cause loosening of the bolts.

In addition, whenever a high-temperature chemical solution is used, repeated thermal deformation due to a temperature difference between upper and lower portions thereof causes frequent bolt loosening.

Furthermore, bolts that are completely loosened often block a chemical solution drain portion, and the used chemical solution may overflow and contaminate an entire processing bowl.

In order to prevent this, bolt loosening has been reduced by applying various improvements such as bolt coating, helicoil, and the like, but it still occurs and a fundamental solution is required.

(Patent Document 1) Republic of Korea Patent Publication No. 10-2015-0068917

SUMMARY

The present disclosure has been devised to solve the above problems, and an aspect of the present disclosure is to provide a support structure assembled without using bolts, an apparatus for supporting a substrate, and a facility for processing a substrate including the same.

In order to achieve the above-described object, according to an aspect of the present disclosure, a support structure includes: a support plate supporting a substrate; a lower cover covering a lower portion of the support plate; and a catching unit comprising a concave-convex structure having portions corresponding to each other so that the support plate and the lower cover are rotated and assembled with each other.

Here, the catching unit may include a catching groove portion formed on one of the support plate and the lower cover; and a catching protrusion portion formed on the other one of the support plate and the lower cover and rotated and caught in the catching groove portion.

In this case, the catching groove portion may include an outer catching groove formed on an inner surface of an outer edge, bent downwardly from the support plate, and the catching protrusion portion may include an outer catching protrusion formed on an outer edge of the lower cover.

In addition, in a direction, rotated so that the outer catching protrusion is caught in the outer catching groove, the outer locking groove may have an upwardly inclined groove lower surface, and the outer catching protrusion may have an upwardly inclined protrusion lower surface.

Furthermore, the plurality of outer catching grooves may be disposed along an outer edge of the support plate, and a plurality of outer catching protrusions may be disposed along an outer edge of the lower cover.

The support plate has a plate hole formed in a center thereof, the lower cover has a cover hole corresponding to the plate hole formed in a center thereof, and the catching groove portion may include an inner catching groove formed on an inner edge of the support plate as an edge of the plate hole, and the catching protrusion portion may include an inner catching protrusion formed on an inner edge of the cover as an edge of the cover hole.

In addition, in a direction, rotated the inner catching protrusion is caught in the inner catching groove, the inner locking groove may have an upwardly inclined groove lower surface, and the inner catching protrusion may have an upwardly inclined protrusion lower surface.

Furthermore, the plurality of inner catching grooves may be disposed along an inner edge of the support plate, and the plurality of inner catching protrusions may be disposed along an inner edge of the lower cover.

Meanwhile, in the present disclosure, a locking unit configured to lock the support plate and the lower cover in an assembled state, may be further included, wherein the locking unit may include: an elastic member embedded in a lower groove of the support plate; a locking bar disposed in the lower groove, connected to the elastic member, and elastically supported so as to protrude downwardly from the lower groove; and a locking hole portion formed in the lower cover so that the locking bar may be inserted thereinto.

The locking unit may further include a unlocking button disposed to be lifted inside the locking hole portion, wherein the locking hole portion may have a side groove formed therein, the unlocking button has a side protrusion, and the side protrusion may be lifted from the side groove, and when supported on a lower portion of the side groove, may have a structure in which the unlocking button protrudes downwardly from the locking hole portion.

A portion of the support plate and the lower cover in contact with each other may be formed in a labyrinth structure.

The labyrinth structure may be formed at a contact portion between an outer edge of the support plate and an outer edge of the lower cover.

As another embodiment, the outer edge of the support plate and the outer edge of the lower cover of the present disclosure may be installed with a silicon pad ring, respectively, in a contact portion therebetween.

According to another aspect of the present disclosure, an apparatus for supporting a substrate may be provided, the apparatus for supporting a substrate includes: a support structure supporting a substrate; a support shaft disposed below the support structure and supporting the support structure; and a driving member connected to a lower end of the support shaft and rotating the support shaft, wherein the support structure includes: a support plate supporting the substrate; a lower cover covering a lower portion of the support plate; and a catching unit comprising a concave-convex structure having portions corresponding to each other so that the support plate and the lower cover are rotated and attached to each other, wherein the catching unit includes: a catching groove portion formed on one of the support plate and the lower cover; and a catching protrusion portion formed on the other one of the support plate and the lower cover and rotated and caught in the catching protrusion portion.

According to another aspect of the present disclosure, a facility for processing a substrate may be provided, the facility for processing a substrate includes: a process chamber; a processing container installed in the process chamber and having a processing space for processing a substrate; a nozzle unit discharging a chemical solution to the substrate; and an apparatus for supporting a substrate supporting the substrate in the processing space, wherein the apparatus for supporting a substrate includes: a support structure supporting the substrate; a support shaft disposed below the support structure and supporting the support structure; and a driving member connected to a lower end of the support shaft and rotating the rotating shaft, wherein the support structure includes: a support plate supporting the substrate; a lower cover covering a lower portion of the support plate; and a catching unit comprising a concave-convex structure having portions corresponding to each other so that the support plate and the lower cover are rotated and assembled with each other, wherein the catching unit includes: a catching groove portion formed on one of the support plate and the lower cover; and a catching protrusion portion formed on the other one of the support plate and the lower cover and rotated and caught in the catching groove portion.

BRIEF DESCRIPTION OF DRAWINGS

The above and other aspects, features, and advantages of the present disclosure will be more clearly understood from the following detailed description, taken in conjunction with the accompanying drawings, in which:

FIGS. 1 and 2 are perspective views illustrating a support structure according to the prior art.

FIG. 3 is a longitudinal cross-sectional view illustrating the support structure of FIG. 2.

FIG. 4 is a view illustrating a facility for processing a substrate according to an embodiment of the present disclosure.

FIGS. 5 and 6 are views illustrating an internal structure of a support structure according to an embodiment of the present disclosure.

FIG. 7 is a view illustrating a locking and unlocking process of the locking unit in the support structure of FIGS. 5 and 6.

FIG. 8 is a vertical cross-sectional view illustrating a labyrinth structure of the support structure of FIGS. 5 and 6.

FIG. 9 is a vertical cross-sectional view illustrating a support structure in which a silicon pad ring is installed according to another embodiment of the present disclosure.

DETAILED DESCRIPTION

Hereinafter, preferred embodiments of the present disclosure will be described in detail so that those skilled in the art can easily practice the present disclosure with reference to the accompanying drawings. However, in describing a preferred embodiment of the present disclosure in detail, if it is determined that a detailed description of a related known function or configuration may unnecessarily obscure the subject matter of the present disclosure, the detailed description will be omitted. In addition, the same reference numerals are used throughout the drawings for parts having similar functions and actions. In addition, in the present specification, terms such as ‘upper’, ‘upper portion’, ‘upper surface’, ‘lower’, ‘lower portion’, ‘lower surface’, ‘side surface’, and the like are based on the drawings, and in practice, it may be different depending on a direction in which the components are placed.

In addition, throughout the specification, when a part is said to be ‘connected’ to another part, this is not only when it is ‘directly connected’, but also when it is ‘indirectly connected’ with other components therebetween. In addition, ‘including’ a certain component means that other components may be further included without excluding other components unless otherwise stated.

FIG. 4 is a view illustrating a facility for processing a substrate according to an embodiment of the present disclosure.

Referring to FIG. 4, a facility for processing a substrate 3000 of the present disclosure includes a process chamber 3100 performing a process on a substrate W using a chemical solution. In the process chamber 3100, a process is performed on the substrate W while maintaining the substrate W horizontally. The process may be a process of etching a nitride film formed on the substrate W. In this case, the chemical solution may include phosphoric acid. Furthermore, the process chamber 3100 may be used in a process of removing foreign substances and film quality remaining on a surface of the substrate W using various chemical solutions.

Specifically, the process chamber 3100 provides a sealed internal space, and a fan filter unit 3110 is installed thereabove. The fan filter unit 3110 generates vertical airflow inside the process chamber 3100. In the fan filter unit 3110, a filter and an air supply fan are modularized as a single unit, and clean air is filtered and supplied to the process chamber 3100. After the clean air passes through the fan filter unit 3110, the air is supplied to the process chamber 3100 to form a vertical airflow. The vertical airflow provides a uniform airflow above the substrate W, and discharge and remove pollutants (fumes) generated in a process in which a surface of the substrate W is processed by a processing fluid and remove the same together with air through discharge lines 3131, 3132, and 3133 through suction ducts 3210, 3220, and 3230 of a processing container 3200, to maintain a high level of cleanliness inside the processing container.

The process chamber 3100 includes a process region **3100*a* and a maintenance region 3100*b*, partitioned by a horizontal partition wall 3101. A driving member 3293 of a lifting unit 3290 and a driving member 3390 of a nozzle unit 3300 are installed on the horizontal partition wall 3101. In addition, the maintenance region 3100*b* is a space in which the discharge lines 3131, 3132, and 3133 connected to the processing container 3200 and an exhaust member 3120 are located, and it is preferable that the maintenance region 3100*b* is isolated from the process region 3100*a*** in which the substrate S is processed.

The facility for processing a substrate 3000 of the present disclosure may include a processing container 3200, an apparatus for supporting a substrate 2000, and a nozzle unit 3300 in a process chamber 3100. The processing container 3200 is installed inside the process chamber 3100, has a cylindrical shape with an open upper portion, and provides a processing space for processing the substrate W. The open upper surface of the processing container 3200 serves as a path for carrying-out and carrying-in the substrate W. Here, an apparatus for supporting a substrate 2000 is positioned in the processing space. In this case, the apparatus for supporting a substrate 2000 supports the substrate W and rotates the substrate W during the process.

In addition, the processing container 3200 provides an upper space 3200*a* in which the support structure 1000 of the apparatus for supporting a substrate 2000 is located and a lower space 3200*b* connected to an exhaust duct 3250 to perform forced exhaust therebelow. The exhaust duct 3250 is connected to an exhaust member 3120 extending outwardly of the process chamber 3100. In the upper space 3200*a* of the processing container 3200, annular suction ducts 3210, 3220, and 3230 are disposed in multiple stages to introduce and suckchemical liquid and gas scattered on the rotating substrate W. The first, second and third suction ducts 3210, 3220 and 3230 have exhaust ports h communicating with one common annular space (corresponding to the lower space of the processing container).

Here, the first, second, and third suction ducts 3210, 3220, and 3230 provide first to third recovery spaces RS1, RS2, and RS3, into which air currents containing chemicals and fumes scattered from the substrate W flow. The first recovery space RS1 is formed by being partitioned by the first suction duct 3210, and the second recovery space RS2 is formed as a separation space between the first suction duct 3210 and the second suction duct 3220, and the third recovery space RS3 is formed as a separation space between the second suction duct 3220 and the third suction duct 3230.

In addition thereto, the processing container 3200 is coupled with a lifting unit 3290 for changing a vertical position of the processing container 3200. The lifting unit 3290 linearly moves the processing container 3200 in a vertical direction. As the processing container 3200 moves vertically, a relative height of the processing container 3200 with respect to the support structure 1000 is changed. This lifting unit 3290 has a bracket 3291, a moving shaft 3292, and a driving member 3293. The bracket 3291 is fixedly installed on an outer wall of the processing container 3200, and a moving shaft 3292 moved vertically by a driving member 3293 is fixedly coupled to the bracket 3291. When the substrate W is loaded into or unloaded from the support structure 1000, the processing container 3200 descends so that the support structure 1000 protrudes upwardly of the processing container 3200.

In addition, during the process, the height of the processing container 3200 is adjusted so that the chemical solution may flow into the predetermined suction ducts 3210, 3220, and 3230 according to the type of the chemical solution supplied to the substrate W. Accordingly, a relative vertical position between the processing container 3200 and the substrate W is changed. Accordingly, the processing container 3200 may have different types of chemical liquid and pollutant gas recovered for each recovery space RS1, RS2, and RS3.

Meanwhile, the nozzle unit 3300 discharges a chemical solution onto the substrate W supported by the apparatus for supporting a substrate 2000. In this case, the chemical solution may include an etching solution to etch a film formed on the substrate W.

The apparatus for supporting a substrate 2000 includes a support structure, a support shaft, and a driving member. In this case, the support structure 1000 has a circular upper surface, supports the substrate W, and may be rotated by a driving member 2200 during the process. In addition, the support shaft 2100 is disposed below the support structure 1000 to support the support structure 1000. In addition, the driving member 2200 is connected to a lower end of the support shaft 2100 and rotates the support shaft 2100. In this case, the driving member 2200 is provided as a motor, or the like, and as the support shaft 2100 rotates by the driving member 2200, the support structure 1000 and the substrate W rotate.

FIGS. 5 and 6 are views illustrating an internal structure of a support structure according to an embodiment of the present disclosure.

Referring to FIGS. 5 and 6, a support structure 1000 of the present disclosure is also referred to as an electrostatic chuck as a component for supporting a substrate. The support structure 1000 is configured to firmly and stably support the substrate.

Specifically, the support structure 1000 according to an embodiment of the present disclosure includes a support plate 100, a lower cover 200, and a catching unit 300.

The support plate 100 is a member supporting a substrate, and may be formed of a dielectric material. An electrode (not shown) generating electrostatic force by receiving power may be installed inside the support plate 100. When current is applied to the electrode, electrostatic force is generated between the electrode and the substrate, and the movement of the substrate may be restricted by adsorbing the substrate with the electrostatic force. A structure for holding a substrate may be installed below the support plate 100. As an example, a chuck pin operating structure (P in FIG. 3) for aligning the substrate may be installed.

In addition, the lower cover 200 is a member covering the lower portion of the support plate 100, and serves to protect the lower structure of the support plate 100, as described above, from the chemical solution.

The support plate 100 and the lower cover 200 are not limited by the present disclosure as long as they take a shape that firmly and stably supports the substrate in their specific shape structure.

Meanwhile, the locking unit 300 is comprising a concave-convex structure having portions corresponding to each other so that the support plate 100 and the lower cover 200 are rotated and assembled with each other.

Specifically, the catching unit 300 includes a catching groove portion 310 and a catching protrusion portion 320.

The catching groove portion 310 may be formed on one of the support plate 100 and the lower cover 200.

In addition, the catching protrusion portion 320 is formed on the other one of the support plate 100 and the lower cover 200, and has a structure, rotated and caught in the catching groove portion 310.

Specifically, the catching groove portion 310 includes an outer catching groove 311, and the catching protrusion portion 320 includes an outer catching protrusion 321. Here, the outer catching groove 311 may be formed on an inner surface of an outer edge bent downwardly from the support plate 100, and the outer catching protrusion 321 may be formed on an outer edge of the lower cover 200.

The support plate 100 may have a plate hole 100*a* formed in a center thereof, and the lower cover 200 may have a cover hole 200*a* corresponding to the plate hole 100*a* formed in a center thereof.

In this case, the catching groove portion 310 may further include an inner catching groove 312 and the catching protrusion portion 320 may further include an inner catching protrusion 322. Here, the inner catching groove 312 may be formed on an inner edge of the support plate 100 as an edge of the plate hole 100*a*, and the inner catching protrusion 322 may be formed on an inner edge of the cover.

As described above, in the present disclosure, a catching unit 300 is configured so that the support plate 100 and the lower cover 200 are rotated and assembled, and the present disclosure has a bolt-free fastening structure, without a bolt, so that it is possible to prevent assembly disassembly due to the bolt fastening structure, such as loosening of bolts caused by weakening of fastening force due to corrosion (by chemical solution) and loosening of bolts due to thermal deformation.

Furthermore, in a direction in which the catching protrusion portion 320 rotates to be caught by the catching protrusion portion 310, each of the outer catching protrusion 311 and the inner catching groove 312 have upwardly inclined groove lower surfaces 311*a* and 312*a*, and each of the outer catching protrusion 321 and the inner catching protrusion 322 have upwardly inclined protrusion lower surfaces 321*a* and 322*a*.

Accordingly, in a process of rotating the catching protrusion portion 320 of the lower cover 200 to be caught in the catching groove portion 310 of the support plate 100, as the upwardly inclined protrusion lower surface 321*a* of the outer catching protrusion 321 is in contact with the upwardly inclined groove lower surface 311*a* of the outer catching groove 311, a contact surface gradually increases and eventually an entire surface comes into contact, and as the upwardly inclined protrusion lower surface 322*a* of the inner catching protrusion 322 is in contact with the upwardly inclined groove lower surface 311*a* of the inner catching groove 321, a contact surface gradually increases and eventually an entire surface comes into contact.

In this case, due to a structure of the upwardly inclined protrusion lower surface 321*a* of the outer catching protrusion 321 and the upwardly inclined groove lower surface 311*a* of the outer catching groove 311, a front end portion of the outer catching protrusion 321, introduced into the outer catching groove 311 is formed to have a narrow thickness at an upper side thereof, an entrance of the outer catching groove 311 into which the outer catching protrusion 321 is introduced is formed to be large, so that the outer catching protrusion 321 is smoothly and easily introduced into the outer catching groove 311, and as it rotates, it is gradually force fitted thereinto. Similarly thereto, due to the structure of the upwardly inclined protrusion lower surface 322*a* of the inner catching protrusion 322 and the upwardly inclined groove lower surface 312*a* of the inner catching groove 312, a front end portion of the inner catching protrusion 322, introduced into the inner catching groove 312 is formed to have a narrow thickness at an upper side thereof, an entrance of the inner catching groove 312 into which the inner catching protrusion 322 is introduced is formed to be large, so that the inner catching protrusion 322 is smoothly and easily introduced into the inner catching groove 312, and as it rotates, it is gradually force fitted thereinto.

The plurality of outer catching grooves 311 configured as described above may be disposed along the outer edge of the support plate 100, and the plurality of outer catching protrusions 321 may be disposed along the outer edge of the lower cover 200, thereby increasing fixing force thereof when assembling the support plate 100 and the lower cover 200. In addition, the plurality of inner locking grooves 312 may be disposed along the inner edge of the support plate 100, and the plurality of inner catching protrusions 322 may be disposed along the inner edge of the lower cover 200, thereby further improving the fixing force thereof when assembling the support plate 100 and the lower cover 200.

FIG. 7 is a view illustrating a locking and unlocking process of the locking unit in the support structure of FIGS. 5 and 6.

Referring to FIGS. 5 to 7, a support structure 1000 according to the present disclosure may further include a locking unit 400. The locking unit 400 is configured to be locked when the support plate 100 and the lower cover 200 are assembled.

Specifically, the locking unit 400 includes an elastic member 410, a locking bar 420, and a locking hole portion 430.

The elastic member 410 is embedded in a lower groove 100*b* of the support plate 100. That is, the elastic member 410 may be disposed inside the lower groove 100*b* formed in a lower portion of the support plate 100, and an upper end thereof may be connected to an inner upper surface of the lower groove 100*b* to be fixed in position.

In addition, the locking bar 420 is disposed in the lower groove 100*b* and has an upper end connected to the elastic member 410. In this case, the locking bar 420 is elastically supported downwardly by the elastic member 410, and maintains a state of protruding downwardly from the lower groove 100*b* when there is no external force.

The locking hole portion 430 is formed in an upper portion of the lower cover 200, and takes a structure in which a lower portion of the locking bar 420 may be inserted. That is, when the locking bar 420 connected to the support plate 100 by the elastic member 410 and the locking hole portion 430 of the lower cover 200 are disposed to correspond to each other in a vertical direction, the locking bar 420 is lowered by the elastic force of the elastic member 410 so that the lower portion of the locking bar 420 is inserted into the locking hole portion 430. As described above, when the lower portion of the locking bar 420 is inserted into the locking hole portion 430, the support plate 100 and the lower cover 200 form a state in which rotation with respect to each other is blocked. Conversely, when the locking bar 420 is pushed up by an external force, the lower portion of the locking bar 420 protrudes from the locking hole 430 upwardly. As described above, when the lower portion of the locking bar 420 protrudes from the locking hole portion 430, the support plate 100 and the lower cover 200 form a mutually rotatable state.

Furthermore, the locking unit 400 may further include a unlocking button 440.

The lock release button 440 is disposed to be lifted inside the locking hole portion 430.

Specifically, the locking hole portion 430 has a side groove 430*a* formed therein, and the lock release button 440 has a side protrusion 440*a* formed on a side portion thereof. In this case, a vertical length of the side groove 430*a* is formed to be longer than a vertical length of the side protrusion 440*a*, so that the side protrusion 440*a* is lifted in the side groove 430*a*. In addition, the lock release button 440 forms a state in which the lock release button 440 protrudes downwardly of the locking hole portion 430 when the side protrusion 440*a* is supported by the lower portion of the side groove 430*a*.

When the unlocking button 440 is raised from the lower side thereof by an external force, the upper locking bar 420 may be pushed up, so that the locking bar 420 protrudes from the locking hole portion 430 upwardly.

A locking and unlocking process of the support plate 100 and the lower cover 200 according to the above configuration will be described as follows.

In a process of rotating the support plate 100 and the lower cover 200 in close contact with each other to catch and fix the same through a locking unit 300, when the support plate 100 and the lower cover 200 are in close contact with each other, an upper surface of the lower cover 200 pushes the locking bar 420 up, and when the lower cover 200 is rotated and the locking hole portion 430 of the lower cover 200 is located directly below the locking bar 420, as illustrated in a lower left drawing of FIG. 7, the lower portion of the locking bar 420 is inserted into the locking hole portion 430 (in a state in which an elastic member 410 is expanded), so that the support plate 100 and the lower cover 200 are locked in a state of being caught and fixed.

Conversely, as illustrated in a lower right drawing of FIG. 7, when an user pushes the lock release button 440 upwardly to push the locking bar 420 up, a lower portion of the locking bar 420 protrudes from the locking hole portion 430, so that unlocking is performed, and in this unlocked state, when the lower cover 200 is rotated in a direction the reverse of the direction for locking, locking and fixing of the support plate 100 and the lower cover 200 is released.

As described above, according to the present disclosure, the locking unit 400 may be configured, so that the support plate 100 and the lower cover 200 may be locked and unlocked smoothly and easily.

FIG. 8 is a vertical cross-sectional view illustrating a labyrinth structure of the support structure of FIGS. 5 and 6.

Referring to FIG. 8, a support plate 100 and a lower cover 200 of the support structure 1000 may have a portion, in contact with each other, formed in a labyrinth structure L. Specifically, the labyrinth structure L may be formed in a contact portion of the outer edge of the support plate 100 and the outer edge of the lower cover 200, thereby safely protecting a structure disposed inside the support structure 1000. The labyrinth structure L is a structure in which the contact portion of the support plate 100 and the lower cover 200 is bent multiple times, and as airtightness is excellent, an internal component between the support plate 100 and the lower cover 200 may be protected by minimizing permeation of the chemical solution from the outside to the outside.

FIG. 9 is a vertical cross-sectional view illustrating a support structure in which a silicon pad ring is installed according to another embodiment of the present disclosure.

Referring to FIG. 9, in a support structure 1000 of the present disclosure, an outer edge of a support plate 100 and an outer edge of a lower cover 200 may be respectively have a silicon pad ring R installed at a contact portion with each other. The silicon pad ring R may perform a sealing action on the contact portion between the outer edge of the support plate 100 and the outer edge of the lower cover 200. Furthermore, the silicon pad ring R is installed to be wound along the outer edge of the support plate 100, so that the silicon pad ring R presses the support plate 100 and the lower cover 200 at a certain amount of force to maintain an initial state thereof when the support plate 100 and the lower cover 200 are thermally deformed during a high-temperature substrate treatment process and then restored to an initial state thereof.

As set forth above, according to the present disclosure, as a catching unit is configured so that a support plate and a lower cover are rotated with each other and assembled, a bolt-free fastening structure in which a bolt is not used is adopted, thereby preventing assembly disassembly such as loosening of the bolts, or the like.

While exemplary embodiments have been shown and described above, it will be apparent to those skilled in the art that modifications and variations could be made without departing from the scope of the present invention as defined by the appended claims.

DESCRIPTION OF REFERENCE NUMERALS

3000: FACILITY FOR PROCESSING SUBSTRATE
3100: PROCESS CHAMBER
3100A: PROCESS REGION
3100B: MAINTENANCE REGION
3101: HORIZONTAL PARTITION WALL
3110: FAN FILTER UNIT
3120: EXHAUST MEMBER
3131~3133: DISCHARGE LINE
3200: PROCESSING CONTAINER
3200A: UPPER SPACE
3200B: LOWER SPACE
3210: FIRST SUCTION DUCT
3220: SECOND SUCTION DUCT
3230: THIRD SUCTION DUCT
3250: EXHAUST DUCT
3290: LIFTING UNIT
3291: BRACKET
3292: MOVING SHAFT
3293: DRIVING MEMBER
3300: NOZZLE UNIT
2000: APPARATUS FOR PROCESSING SUBSTRATE
2100: SUPPORT SHAFT
2200: DRIVING MEMBER
1000: SUPPORT STRUCTURE
100: SUPPORT PLATE
100A: PLATE HOLE
100B: LOWER GROOVE
200: LOWER COVER
200A: COVER HOLE
300: CATCHING UNIT
310: CATCHING GROOVE PORTION
311: OUTER CATCHING GROOVE
311A: GROOVE LOWER SURFACE (OF OUTER CATCHING GROOVE)
312: INNER CATCHING GROOVE
312A: GROOVE LOWER SURFACE (OF INNER CATCHING GROOVE)
320: CATCHING PROTRUSION PORTION
321: OUTER CATCHING GROOVE
321A: PROTRUSION LOWER SURFACE (OF OUTER CATCHING GROOVE)
322: INNER CATCHING GROOVE
322A: PROTRUSION LOWER SURFACE
400: LOCKING UNIT
410: ELASTIC MEMBER
420: LOCKING BAR
430: LOCKING HOLE PORTION
430A: SIDE GROOVE
440: UNLOCKING BUTTON
440A: SIDE PROTRUSION
W: SUBSTRATE
H: EXHAUST PORT
L: LABYRINTH STRUCTURE
R: SILICON PAD RING

What is claimed is:

1. A support structure, comprising:
a support plate supporting a substrate;
a lower cover covering a lower portion of the support plate;
a catching unit comprising a concave-convex structure having portions corresponding to each other so that the support plate and the lower cover are rotated and assembled with each other;
a locking unit configured to be locked in a state in which support plate and the lower cover are assembled, wherein the locking unit includes:
an elastic member embedded in a lower groove of the support plate;

a locking bar disposed in the lower groove, and connected to the elastic member and be elastically supported so as to protrude downwardly from the lower groove; and a locking hole portion formed in the lower cover to insert the locking bar.

2. The support structure of claim 1, wherein the catching unit comprises a catching groove portion formed on one of the support plate and the lower cover; and a catching protrusion portion formed on the other one of the support plate and the lower cover and rotated and caught in the catching groove portion.

3. The support structure of claim 2, wherein the catching groove portion comprises an outer catching groove formed on an inner surface of an outer edge, bent downwardly from the support plate, and the catching protrusion portion comprises an outer catching protrusion formed on an outer edge of the lower cover.

4. The support structure of claim 3, wherein, in a direction, rotated so that the outer catching protrusion is caught in the outer catching groove, the outer catching groove has an upwardly inclined groove lower surface formed therein, and the outer catching groove protrusion has an upwardly inclined protrusion lower surface formed therein.

5. The support structure of claim 3, wherein the plurality of outer catching grooves are disposed along the outer edge of the support plate, and the plurality of outer catching protrusions are disposed along the outer edge of the lower cover.

6. The support structure of claim 2, wherein the support plate has a plate hole formed in a center thereof, and the lower cover has a cover hole corresponding to the plate hole in a center thereof, and the catching groove portion comprises an inner catching groove formed on an inner edge of the support plate, as an edge of the plate hole, and the catching protrusion portion comprises an inner catching protrusion formed on an inner edge of the cover as an edge of the cover hole.

7. The support structure of claim 6, wherein, in a direction, rotated so that the inner catching protrusion is caught in the inner catching groove, the inner catching groove has an upwardly inclined groove lower surface, and the inner catching groove has an upwardly inclined protrusion lower surface.

8. The support structure of claim 6, wherein the plurality of inner catching grooves are disposed along the inner edge of the support plate, and the plurality of inner catching protrusions are disposed along the inner edge of the lower cover.

9. The support structure of claim 1, wherein the locking unit further comprises an unlocking botton disposed to be lifted inside the locking hole portion, wherein the locking hole has a side groove formed therein, and the unlocking button has a side protrusion formed therein, and the side protrusion may be lifted in the side groove, and when supported by a lower portion of the side groove, the unlocking botton protrudes downwardly of the locking hole portion.

10. The support structure of claim 1, wherein the support plate and the lower cover has a portion in contact with each other, formed in a labyrinth structure.

11. The support structure of claim 10, wherein the labyrinth structure is formed in a contact portion between an outer edge of the support plate and an outer edge of the lower cover.

12. The support structure of claim 1, wherein the outer edge of the support plate and the outer edge of the lower cover are installed with a silicon pad ring in a contact portion therebetween, respectively.

13. An apparatus for supporting a substrate, comprising:

a support structure supporting a substrate;

a support shaft disposed below the support structure and supporting the support structure; and a driving member connected to a lower end of the support shaft and rotating the support shaft, wherein the support structure, includes a support plate supporting the substrate;

a lower cover covering a lower portion of the support plate; and a catching unit comprising a concave-convex structure having portions corresponding to each other so that the support plate and the lower cover are rotated and assembled with each other, wherein the catching unit, includes a catching groove portion formed on one of the support plate and the lower cover; and a catching protrusion portion formed on the other one of the support plate and the lower cover and rotated and caught in the catching groove portion.

14. The apparatus for supporting a substrate of claim 13, wherein the catching groove portion comprises an outer catching groove formed on an inner surface of an outer edge, bent downwardly from the support plate, and the catching protrusion portion comprises an outer catching protrusion formed on an outer edge of the lower cover.

15. The apparatus for supporting a substrate of claim 13, wherein, in a direction, rotated so that the outer catching protrusion is caught in the outer locking groove, the outer catching groove has an upwardly inclined groove lower surface formed therein, and the outer catching protrusion has an upwardly inclined protrusion lower surface formed therein.

16. The apparatus for supporting a substrate of claim 13, wherein the support plate has a plate hole formed in a center thereof, and the lower cover has a cover hole corresponding to the plate hole formed in a center thereof, wherein the catching groove portion comprises an inner catching groove formed on an inner edge of the support plate as an edge of the plate hole, and the catching protrusion portion comprises an inner catching protrusion formed on an inner edge of the cover as an edge of the cover hole.

17. The apparatus for supporting a substrate of claim 16, wherein, in a direction, rotated so that the inner catching protrusion is caught in the inner catching groove, the inner catching groove has an upwardly inclined groove lower surface, and the inner catching protrusion has an upwardly inclined protrusion lower surface.

18. A facility for processing a substrate, comprising:

a process chamber;

a processing container installed in the process chamber and having a processing space for processing a substrate;

a nozzle unit discharging a chemical solution to the substrate; and an apparatus for supporting a substrate supporting the substrate in the processing space, wherein the apparatus for supporting a substrate includes, a support structure supporting the substrate;

a support shaft disposed below the support structure and supporting the support structure; and a driving member connected to a lower end of the support shaft and rotating the support shaft, wherein the support structure, includes a support plate supporting the substrate;

a lower cover covering a lower portion of the support plate; and a catching unit comprising a concave-convex structure having portions corresponding to each other so that the support plate and the lower cover are rotated and assembled with each other, wherein the catching unit includes a catching groove portion formed on one of the support plate and the lower cover; and a catching protrusion formed on the other one of the support plate and the lower cover and rotated and caught in the locking groove.

19. The facility for processing a substrate of claim 18, wherein the catching groove portion comprises an outer catching groove formed on an inner surface of an outer edge, bent downwardly from the support plate, and the catching protrusion portion comprises an outer catching protrusion formed on an outer edge of the lower cover, wherein, in a direction, rotated so that the outer catching protrusion is caught in the outer catching groove, the outer catching groove has an upwardly inclined groove lower surface formed therein and the outer catching protrusion has an upwardly inclined protrusion lower surface, the support plate has a plate hole formed in a center thereof, and the lower cover has a cover hole corresponding to the plate hole formed in a center thereof, the catching groove portion includes an inner catching groove formed on an inner edge of the support plate as an edge of the plate hole, and the catching protrusion portion includes an inner catching protrusion formed on an inner edge of the cover as an edge of the cover hole, wherein, in a direction, rotated so that the inner catching protrusion is caught in the inner catching groove, the inner catching groove has an upwardly inclined groove lower surface, and the inner catching protrusion has an upwardly inclined protrusion lower surface.

* * * * *